United States Patent
Fernandes et al.

(10) Patent No.: US 7,561,676 B2
(45) Date of Patent: Jul. 14, 2009

(54) METHOD FOR SENDING TELEPHONE MESSAGE TAG FROM CALLING PARTY TO RECIPIENT

(75) Inventors: Lilian Sylvia Fernandes, Austin, TX (US); Vinit Jain, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1192 days.

(21) Appl. No.: 10/955,178

(22) Filed: Sep. 30, 2004

(65) Prior Publication Data

US 2006/0072713 A1    Apr. 6, 2006

(51) Int. Cl.
*H04M 11/00*    (2006.01)
(52) U.S. Cl. .............. 379/88.13; 379/88.12; 379/88.21; 379/88.22; 379/142.03; 379/142.05
(58) Field of Classification Search ... 379/88.11–88.21, 379/21, 93.35, 142.01–142.08, 215.01, 127.01, 379/67.1, 207.02, 207.11, 210.02–210.03, 379/211.02, 221.14, 201.11, 340
See application file for complete search history.

(56) References Cited

U.S. PATENT DOCUMENTS

| | | | |
|---|---|---|---|
| 5,941,945 A | 8/1999 | Aditham et al. ............. 709/205 |
| 6,192,116 B1 * | 2/2001 | Mayak .................. 379/142.08 |
| 6,580,784 B2 | 6/2003 | Rodriguez et al. ....... 379/88.12 |
| 6,594,351 B1 | 7/2003 | Bhogal et al. .......... 379/100.01 |
| 6,697,479 B1 | 2/2004 | Barnes et al. .......... 379/215.01 |
| 2003/0003898 A1 | 1/2003 | Banerjee et al. ............. 455/414 |
| 2006/0072717 A1 * | 4/2006 | Jindal ..................... 379/88.17 |

OTHER PUBLICATIONS

IBM Technical Disclosure Bulletin, n454, Feb. 2002, Article 157, p. 323, "A Method for Controlling Unwanted Telephone Calls and E-mail".

IBM Technical Disclosure Bulletin, n437, Sep. 2000, Article 123, p. 1698, "Dialing Some Information to the Another End of the Telephone Line During the Connection".

* cited by examiner

*Primary Examiner*—Benny Q Tieu
*Assistant Examiner*—Mohammad K Islam
(74) *Attorney, Agent, or Firm*—Yee & Associates, P.C.; Matthew W. Baca

(57) ABSTRACT

A method and apparatus is provided for enabling a telephone caller to generate a brief message for transmission to an intended call recipient, as part of the initial procedure of setting up a phone call between the caller and recipient. The message is sent and displayed or otherwise made available to the recipient before the recipient is required to answer the call. The message could comprise a sequence of alphanumeric characters that conveyed an abbreviated message, or otherwise indicates the purpose to the call to the recipient or provides other information. Respective characters could be transmitted as corresponding sequences of binary tones sent to the call recipient between telephone rings.

1 Claim, 1 Drawing Sheet

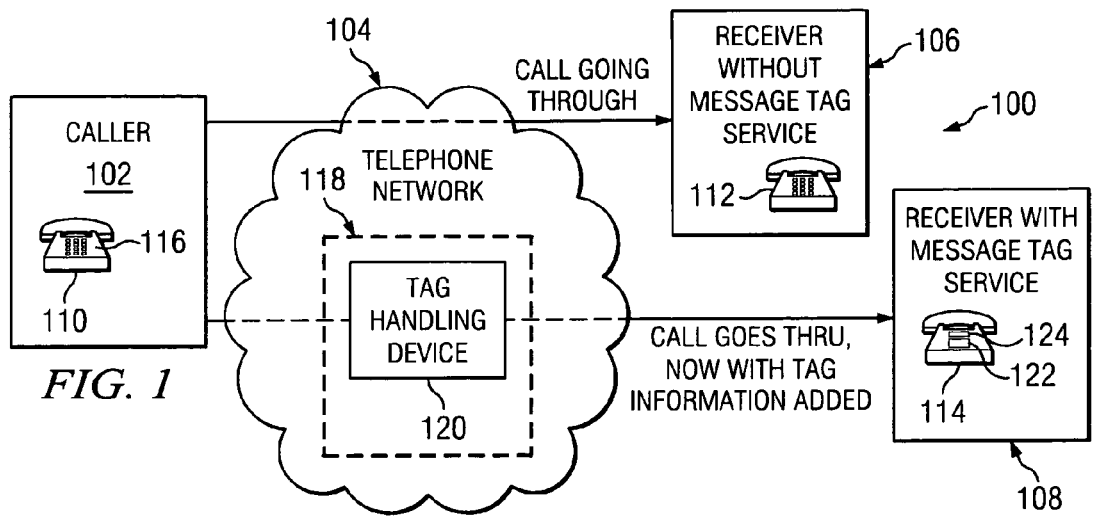
FIG. 1
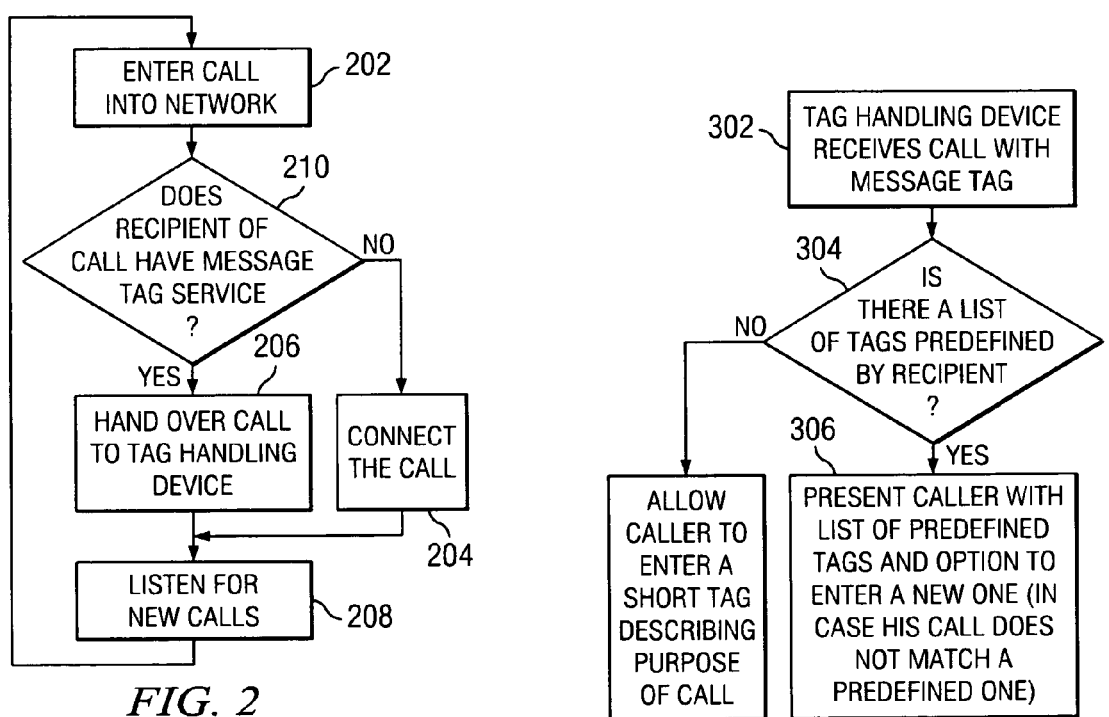
FIG. 2
FIG. 3
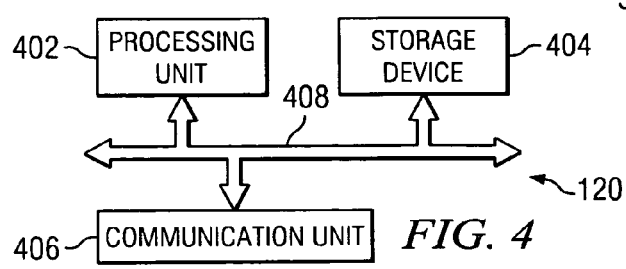
FIG. 4

METHOD FOR SENDING TELEPHONE MESSAGE TAG FROM CALLING PARTY TO RECIPIENT

BACKGROUND OF THE INVENTION

1. Technical Field

The invention disclosed herein generally relates to a method for transmitting a message from a telephone caller to a telephone call recipient, wherein message transmission takes place during the call set up procedure. More particularly, the invention relates to a method of the above type wherein the message is defined by a sequence of alphanumeric characters that are pressed, dialed or otherwise entered using the caller's phone, just prior to entering the recipient's phone number.

2. Description of Related Art

It is very common for a person to receive a telephone call at a time when he or she would very much prefer not to answer the call. For example, the person may be in a meeting or may be about to sit down to dinner. Under these circumstances, the person would typically want to answer the phone call only if the call was known to be urgent.

At present, caller identification (ID) systems are available that can provide a recipient with the name or identity of the caller, before an incoming call is answered. Such systems may provide only the caller's phone number, if the caller is unknown. However, the caller's name and phone number may still be insufficient information to enable a called recipient to decide whether or not to answer an inconveniently timed call. Accordingly, it would be useful to provide the call recipient with additional information, such as a brief reference indicating the purpose of the call.

SUMMARY OF THE INVENTION

A useful embodiment of the invention is directed to a method for enabling a telephone caller to send a message to a recipient having a specified phone number, wherein the message is defined by a specified group of alphanumeric characters. The method includes the step of receiving a signal comprising first and second signal components, the first signal component representing a message generated by the caller at the caller's phone, and the second signal component representing the specified phone number. The method further includes transmitting the signal to an intermediate site located between the caller and the recipient, and processing the signal at the intermediate site to determine whether or not the recipient is authorized to receive the message represented by the first signal component. The signal is routed to the recipient upon determining that the recipient is so authorized, and the first signal component is decoded at the recipient's location to make the message available to the recipient.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a schematic diagram showing a system for use with an embodiment of the invention.

FIG. 2 is a flow chart illustrating operation of the system shown in FIG. 1.

FIG. 3 is a flow chart illustrating operation of a tag handling device for the system shown in FIG. 1.

FIG. 4 is a schematic diagram showing a tag handling device for the system shown in FIG. 1.

DETAILED DESCRIPTION OF THE PREFERRED EMBODIMENT

The invention provides a method and apparatus whereby a telephone caller can generate a message for transmission to an intended call recipient, as part of the procedure for setting up the call. Thus, the message is sent and made available to the recipient before the call needs to be answered. The message, for example, could comprise a sequence of alphanumeric characters that conveys a message in obvious abbreviated form, or that otherwise indicates the purpose of the call to the recipient. However, the invention is not limited thereto.

Referring to FIG. 1, there is shown a telephone system 100 that includes apparatus for use in implementing an embodiment of the invention. More particularly, there is shown a telephone caller 102 disposed to direct telephone calls through a telephone network 104 to phone recipients 106 and 108. Caller 102 has a telephone 110, and recipients 106 and 108 have telephones 112 and 114, respectively. Recipient 108 has subscribed to a message tag service, whereby recipient 108 is enabled to receive messages in accordance with the embodiment of the invention. Recipient 106, however, has not subscribed to the message tag service and is not authorized to receive such messages. Messages are referred to herein as tags, since they usefully comprise comparatively short sequences of alphanumeric characters, or other characters specified by the American Standard Code for Information Interchange (ASCII) or the like.

A message tag sequence is entered or inputted to the telephone network 104 by means of respective buttons of the keypad 116 of caller's telephone 110. A message tag may simply indicate the purpose of the call. Alternatively, the message tag may be a code defining a message that will be readily understood by the intended recipient. Preferably, caller 102 will first sequentially input respective characters of a message tag, and will then enter respective digits of the phone number of the intended recipient.

As an example of use of the embodiment of the invention, a recipient 108 is someone who has placed an item for sale in a classified advertisement. The advertisement includes the recipient's phone number, along with a message tag such as SALE01 for use in calling the recipient in connection with the advertisement. Thus, when a prospective buyer calls the recipient, the caller would first enter the message tag into his phone, and then input the listed phone number. The recipient 108, upon seeing the reference tag SALE01 as recipient's phone is ringing, would know that the call was related to the item the recipient had advertised for sale.

Referring further to FIG. 1, there is shown a tag handling device 120, located at a tag processing site 118 in network 104 between caller 102 and recipients 106 and 108. Usefully, each tag message generated by caller 102 will be a character sequence, as described above, that has pre-specified length and also a pre-specified prefix, such as the characters "XYZ" or the like. Telephone network 104 is configured to recognize from the pre-specified prefix that a message tag is being transmitted. Network 104 is further configured to determine, from the phone number associated with the message, whether or not the intended recipient is a subscriber to the message tag service.

If the recipient is not a subscriber, network 104 will proceed to set up a call between the caller and the intended recipient, but the message will not be routed to the recipient. However, if the intended recipient is found to be a subscriber to the message tag service, then network 104 will direct the call and message to the tag handling device 120. A call will then be set up between the caller and the intended recipient, and the message will be sent to the recipient as part of the call set up procedure, as described hereinafter in further detail.

Referring to FIG. 2, there is a shown a flow chart provided with function blocks 202-208 and a decision block 210, which collectively depict operation of the system 100 described above. Thus, when caller 102 enters a message tag into network 104 along with a call directed to recipient 106, decision block 210 will determine that the recipient 106 is not authorized to use the message tag service. Accordingly, a call will be established between caller 102 and recipient 106, as indicated by function block 204. However, the message will not be routed to recipient 106. On the other hand, when caller 102 enters a tag message along with the phone number of recipient 108 into the network 104, the call and message are routed to tag handling device 120, as shown by function block 206. Thereafter, network 104 will return to a mode of listening for the next call, as indicated by function block 208.

As is known by those of skill in the art, a signal containing caller ID information is transmitted to a recipient during the ring signal that is sent to the recipient. More particularly, in one conventional arrangement a succession of tones are transmitted to the recipient between the first and second rings, wherein tones or frequencies of 1200 hertz and 2200 hertz represent binary 1's and 0's, respectively. The succession of binary tones comprises ASCII character data that indicates the name and phone number of the caller. This data is decoded at the recipient's phone, to display alphanumeric characters identifying the caller.

It is anticipated that tag handling device 120 could include a component similar to devices of the type described above for generating and transmitting caller ID information to phone call recipients. Such component could uniquely represent every number and letter of the alphabet as a corresponding sequence of binary 1's and 0's, and therefore as a corresponding sequence of binary tones. Other ASCII characters besides letters and numbers could also be represented by binary tone sequences. Character data that encodes a tag message could be transmitted from tag handling device 120 to telephone 114 of caller 108 between successive ring signals, such as between the first and second rings. A decoder 122 located at telephone 114 would then decode the tone sequences, to recover the respectively corresponding characters of the tag message. Thereupon, the characters of the message would be presented to the recipient 108 for viewing, such as by means of a display window 124 incorporated into telephone 114.

As a further feature, tag handling device 120 may be provided with a database for storing a list of tags, or alphanumeric sequences, that are selected by a recipient 108 to define respective corresponding messages. The recipient would enter each tag into the database, after subscribing to the message tag service.

Referring to FIG. 3, there is shown a flow chart illustrating further operational features of tag handling device 120, for use in setting up a call between caller 102 and the recipient 108. Thus, when a tag handling device receives a call and associated message tag, as shown by function block 302, decision block 304 indicates that the presence or absence of a list of tags in tag handling device 120 must be determined. If there is a list for the recipient 108, and if the initial message is not on the list, tag handling device 120 sends the list to caller 102, as shown by function block 306. If the caller then selects a message tag from the list, or if the initial message sent by caller 102 is on the list, function block 308 shows that the network will proceed to establish a call between caller 102 and recipient 108, and the message information will be sent to the recipient. Caller ID information may also be sent to recipient 108, together with the message information. If it is determined that tag handling device 120 does not contain a list of tags for recipient 108, function block 310 indicates that caller 102 will be allowed to enter any sequence of alphanumeric characters that meets specified criteria. This may be implemented by sending an instruction to the caller, indicating that the sequence should, for example, be no more than a specified maximum number of characters. The caller may also be instructed to use a sequence that would briefly indicate the purpose of the call.

Referring to FIG. 4, there is shown a simplified configuration for tag handling device 120 comprising a processing unit 402, a data storage device 404, such as a database or the like, and a communication unit 406. Components 402-406 are interconnected by means of a bus 408. Processing unit 402 could, for example, comprise a wide range of processors and ASIC devices. Communication unit 406 may employ switches or routers. Tag handling device 120 could be located at a node or signaling point of an SS7 network, and could be implemented within, or as part of, a Signal Transfer Point (STP). An STP serves as a router for packets in the SS7 network.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for enabling a telephone caller to send a message to a recipient having a specified phone number, said method comprising:

receiving a signal from a caller's phone wherein the signal comprises first and second signal components that are defined by characters specified by the American Standard Code for Information Interchange, said first signal component representing a message generated by said caller at said caller's phone, and said second signal component representing said specified phone number of said recipient, wherein said characters comprise alphanumeric characters that are sequentially entered by said caller to generate said first signal component, said character sequence collectively comprising said message;

transmitting said signal to an intermediate site located between said caller and said recipient;

processing said signal at said intermediate site to determine whether or not said recipient is authorized to receive said message represented by said first signal component, wherein said processing includes determining whether said recipient subscribes to a message service that enables said recipient to receive said message, and wherein said signal is directed to a tag handling device in response to determining that said recipient subscribes to said message service, and wherein said tag handling device notifies said caller to submit an alphanumeric character sequence that is different from the alphanumeric character sequence initially entered by said caller, and wherein said tag handling device contains a list of tags, each of said tags defining a different message prespecified by said recipient, and said caller is notified by said tag handling device to select and enter any tag from said list, and wherein said first signal component is disregarded and said second signal component is routed to said recipient to establish a connection between said caller and said recipient in response to determining that said recipient does not subscribe to said message service; and routing said signal to said recipient upon determining that said recipient is authorized to receive said first signal component, whereupon said first signal component is decoded at the location of said recipient to present said message to said recipient, wherein said first signal component is decoded to provide said sequence of alphanumeric characters for display within a display device in said recipient's phone.

\* \* \* \* \*